United States Patent
Nagasaki et al.

(10) Patent No.: US 8,227,118 B2
(45) Date of Patent: Jul. 24, 2012

(54) METHOD OF DRIVING FUEL CELL DEVICE

(75) Inventors: Terumasa Nagasaki, Ome (JP); Takahiro Suzuki, Tokyo (JP); Ryoichi Sebori, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 863 days.

(21) Appl. No.: 12/190,412

(22) Filed: Aug. 12, 2008

(65) Prior Publication Data

US 2009/0061266 A1    Mar. 5, 2009

(30) Foreign Application Priority Data

Aug. 29, 2007  (JP) .................................. 2007-222784

(51) Int. Cl.
*H01M 8/04* (2006.01)
(52) U.S. Cl. ....................................... 429/408; 429/434
(58) Field of Classification Search .................. 429/408, 429/447, 457, 509
See application file for complete search history.

(56) References Cited

FOREIGN PATENT DOCUMENTS

| JP | 2004-171813 | 6/2004 |
| JP | 2006-73486 | 3/2006 |
| JP | 2006-286239 | * 10/2006 |
| JP | 2006-286321 | 10/2006 |

* cited by examiner

*Primary Examiner* — Jennifer Michener
*Assistant Examiner* — Monique Wills
(74) *Attorney, Agent, or Firm* — Blakely, Sokoloff, Taylor & Zafman LLP

(57) ABSTRACT

According to one embodiment, a method of driving a fuel cell device includes calculating a fuel shortage based on a difference between the fuel concentration detected by a concentration sensor element and a predetermined desired fuel concentration, and obtaining an efficiency of electricity generation of an electromotive section based on the temperature of the electromotive section detected by a temperature sensor element and the load current measured by a control section. The method includes calculating a fuel consumption by the electromotive section for electricity generation based on the output of the electromotive section and the obtained electricity generation efficiency, and replenishing by a supply section a mixing tank with an amount of fuel equivalent to the sum of the calculated fuel shortage and the calculated fuel consumption, thereby controlling the concentration of the fuel supplied to the electromotive section.

6 Claims, 3 Drawing Sheets

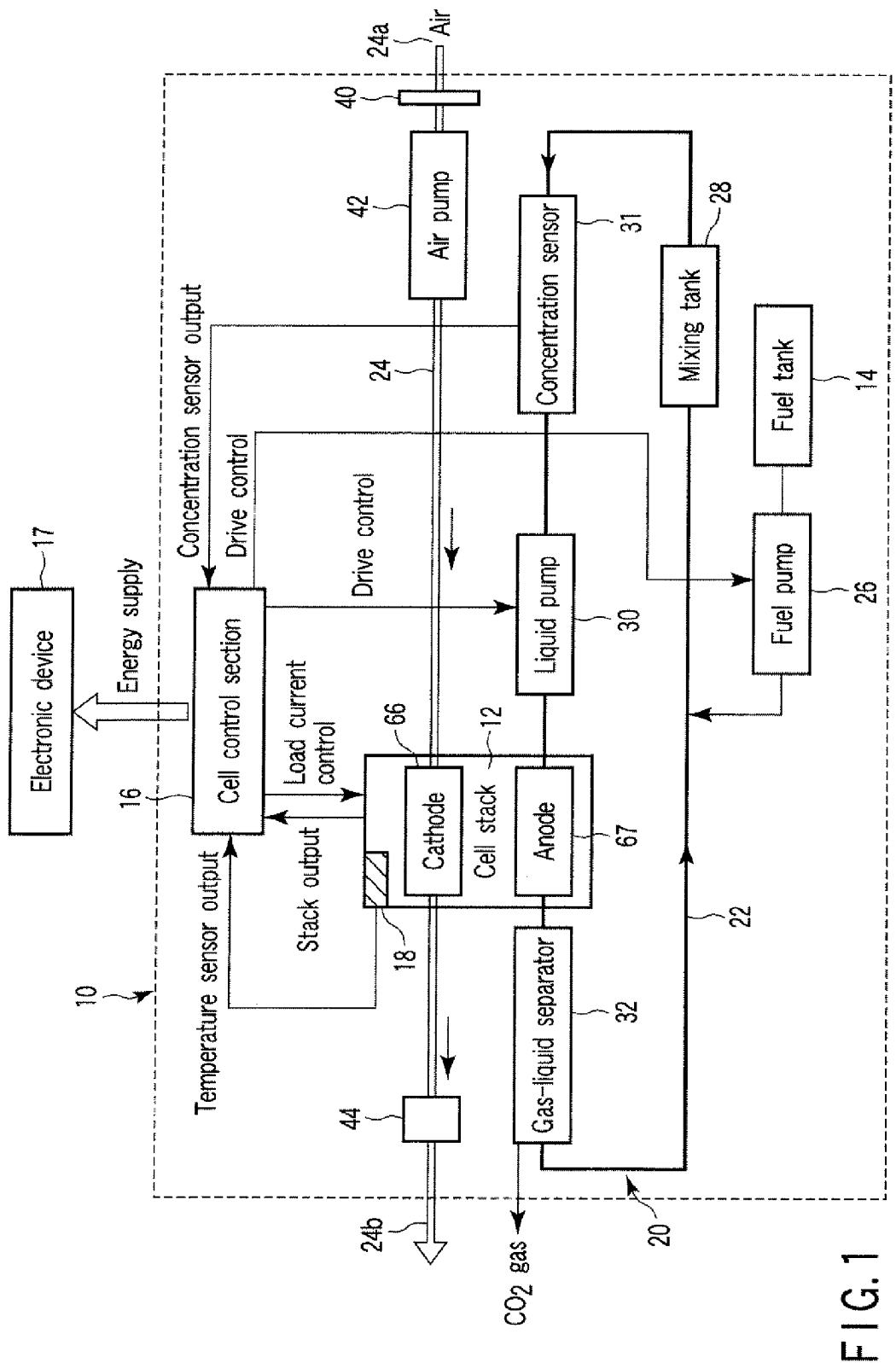
F I G. 1

METHOD OF DRIVING FUEL CELL DEVICE

CROSS-REFERENCE TO RELATED APPLICATIONS

This application is based upon and claims the benefit of priority from Japanese Patent Application No. 2007-222784, filed Aug. 29, 2007, the entire contents of which are incorporated herein by reference.

BACKGROUND

1. Field

One embodiment of the present invention relates to a method of driving a fuel cell device for supplying a current to an electronic device or the like.

2. Description of the Related Art

Presently, secondary batteries, such as lithium ion batteries, are mainly used as energy sources for electronic devices, e.g., portable notebook personal computers (notebook PCs), mobile devices, etc. In recent years, small, high-output fuel cells that require no charging have been expected as new energy sources to meet the demands for increased energy consumption and prolonged use of these electronic devices with higher functions. Among various types of fuel cells, direct methanol fuel cells (DMFCs) that use a methanol solution as their fuel, in particular, enable easier handling of the fuel and a simpler system configuration, as compared with fuel cells that use hydrogen as their fuel. Thus, the DMFCs are noticeable energy sources for the electronic devices.

Usually, a DMFC is provided with a fuel tank that contains methanol, a liquid pump that force-feeds the methanol to an electromotive section, an air pump that supplies air to the electromotive section, etc. The electromotive section is provided with a cell stack composed of laminated single cells, each including an anode and a cathode. As the methanol and air are supplied to the anode and cathode sides, respectively, electricity is generated by a chemical reaction. As reaction products that are produced by the electricity generation, unreacted methanol and carbon dioxide are generated on the anode side of the electromotive section, and water on the cathode side. The water as a reaction product is reduced to steam and discharged.

The fuel cell constructed in this manner has been developed as a cell that ensures a clean exhaust gas. In case of a system abnormality, unreacted methanol, excessive carbon dioxide, or intermediate products, such as formic acid, formaldehyde, etc., may possibly be discharged. In order to operate the fuel cell stably, therefore, its generated electricity and the temperature of the cell stack should be measured as the electromotive section is supplied with a fuel with an optimally controlled concentration.

A fuel cell system disclosed in Jpn. Pat. Appln. KOKAI Publication No. 2006-286239, for example, is provided with a concentration/voltage control mechanism that lowers the concentration of an aqueous methanol solution and the voltage of an electricity generator of a DMFC as the temperature of the generator increases. There is proposed a method in which methanol is supplied to compensate for a shortage compared with a set concentration and the amount of methanol to be replenished is corrected by estimating a methanol consumption in a past predetermined period from a stack output and a fixed fuel consumption factor.

In general, however, the efficiency of electricity generation of a DMFC has characteristics such that it is not fixed with respect to changes in the cell stack temperature and a load current, takes its maximum at a certain temperature or load current, and decreases with distance from the maximum. If any conditions of a DMFC system, especially the stack temperature and the load current, vary when the DMFC system is activated or due to fluctuations in the ambient environment, variations in the energy consumption of an electronic device, etc., therefore, the conventional concentration control with the fuel consumption factor or the electricity generation efficiency regarded as fixed renders the concentration of the aqueous methanol solution that circulates through the anode unstable and affects the stability of the DMFC system.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary diagram schematically showing a fuel cell device according to an embodiment of the invention;

DETAILED DESCRIPTION

Figure 2:
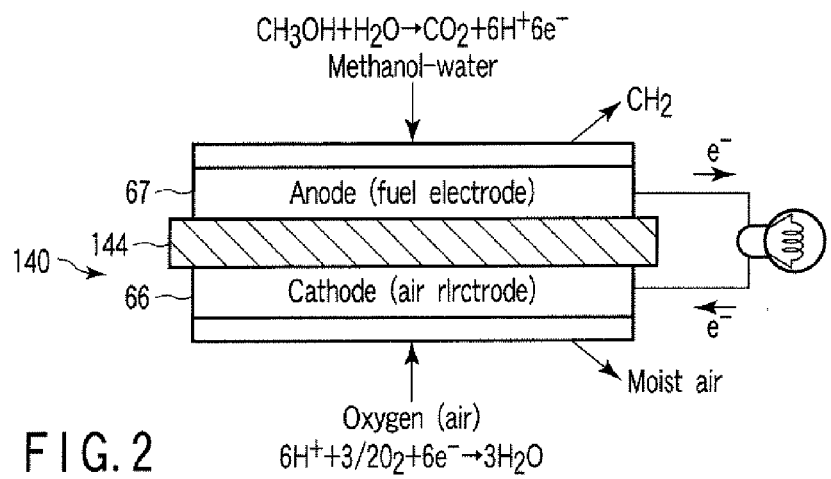
FIG. 2 is an exemplary view schematically showing a single cell constituting a cell stack of the fuel cell device.

An embodiment of this invention will now be described in detail with reference to the accompanying drawings. In general, according to an embodiment of the invention, there is provide a method of driving a fuel cell device which is provided with an electromotive section which includes an anode and a cathode and generates electricity based on a chemical reaction of a fuel supplied to the anode and air supplied to the cathode, a control section which delivers an output from the electromotive section to a connected electronic device based on a load current of the electronic device, a mixing tank configured to contain the fuel supplied to the anode, a fuel channel through which the fuel supplied from the mixing tank is run via the anode side of the electromotive section, an air channel through which air is run via the cathode, a replenishment container which contains a fuel with which the mixing tank is replenished, a fuel supply section which supplies the fuel in the replenishment container to the mixing tank, a concentration sensor element which is disposed in the fuel channel between the mixing tank and the electromotive section and detects a fuel concentration of an aqueous fuel solution flowing through the fuel channel, and a temperature sensor element which detects a temperature of the electromotive section, the method comprising: calculating a fuel shortage based on a difference between the fuel concentration detected by the concentration sensor element and a predetermined desired fuel concentration; obtaining an efficiency of electricity generation of the electromotive section based on the temperature of the electromotive section detected by the temperature sensor element and the load current measured by the control section; calculating a fuel consumption by the electromotive section for electricity generation based on the output of the electromotive section and the obtained electricity generation efficiency; and replenishing by the supply section the mixing tank with an amount of fuel equivalent to the sum of the calculated fuel shortage and the calculated fuel consumption, thereby controlling the concentration of the fuel supplied to the electromotive section.

FIG. 1 schematically shows a fuel cell device 10 according to the embodiment of the invention. As shown in FIG. 1, the fuel cell device 10 is constructed as a DMFC that uses methanol as its liquid fuel. The device 10 is provided with a cell stack 12, a fuel tank 14, a circulation system 20, and a cell control section 16. The cell stack 12 constitutes an electromotive section. The circulation system 20 supplies the fuel and air to the cell stack. The cell control section 16 controls the operation of the entire fuel cell device. The control section 16 includes a microcomputer (CPU) and the like and is electrically connected to the cell stack 12. Further, the control section 16 supplies electricity generated in the cell stack 12 to an electronic device 17, such as a notebook PC, cellular phone, etc. The cell control section 16 simultaneously measures the output energy of the cell stack 12 and a load current from the electronic device 17 to the cell stack 12.

The fuel tank 14 has a sealed structure in which high-concentration methanol as the liquid fuel is contained. The tank 14 may be formed as a fuel cartridge that is removably attached to the fuel cell device 10.

The circulation system 20 includes an anode channel (fuel channel) 22, a cathode channel (gas channel) 24, and a plurality of ancillary components. The fuel that is supplied from a fuel inlet of the fuel tank 14 is run through the anode channel 22 via the cell stack 12. A gas that contains air is circulated through the cathode channel 24 via the cell stack 12. The ancillary components are incorporated in the anode and cathode channels. The anode and cathode channels 22 and 24 are each formed of piping or the like.

The cell stack 12 is formed by stacking a plurality of single cells in layers. FIG. 2 typically shows an electricity generation reaction of each single cell. Each single cell 140 is provided with a membrane electrode assembly (MEA), which integrally includes a cathode (air electrode) 66, an anode (fuel electrode) 67, and a substantially rectangular polymer electrolyte membrane 144. The cathode 66 and the anode 67 are substantially rectangular plates that are each formed of a catalyst layer and a carbon paper. The polymer electrolyte membrane 144 is sandwiched between the cathode and the anode. The polymer electrolyte membrane 144 is greater in area than the anode 67 and the cathode 66.

The supplied fuel and air chemically react with each other in the polymer electrolyte membrane 144 that are interposed between the anode 67 and the cathode 66, whereupon electricity is generated between the anode and the cathode. The electricity generated in the cell stack 12 is supplied to the electronic device 17 through the cell control section 16.

As shown in FIG. 1, the cell stack 12 is fitted with a temperature sensor 18 for detecting its temperature. The sensor 18 is electrically connected to the cell control section 16 and outputs the detected temperature of the cell stack 12 to the cell control section 16.

As shown in FIG. 1, a fuel pump 26 that functions as a fuel supply section is connected to the anode channel 22. The pump 26 is pipe-connected to the fuel inlet of the fuel tank 14. The drive voltage or rotational frequency of the pump 26 is controlled by the cell control section 16, whereby the flow rate of the high-concentration fuel supplied to the anode channel 22 and a mixing tank 28 (mentioned later) is adjusted.

The mixing tank 28 that adjusts the concentration of the fuel is disposed in the anode channel 22 and connected to the output portion of the fuel pump by piping. In the anode channel 22, a liquid pump 30 is provided between the mixing tank and the cell stack 12 and connected to the output portion of the mixing tank 28. The output portion of the liquid pump 30 is connected to the anode 67 of the cell stack 12 through the anode channel 22. Thus, the liquid pump 30 supplies an aqueous methanol solution from the mixing tank 28 to the anode 67.

In the anode channel 22, a concentration sensor 31 is provided between the mixing tank 28 and the liquid pump 30. The sensor 31 detects the concentration of the liquid fuel supplied from the mixing tank 28 to the cell stack 12 and outputs the detected data to the cell control section 16.

The output portion of the anode 67 of the cell stack 12 is connected to the input portion of the mixing tank 28 by the anode channel 22. A gas-liquid separator 32 is attached to that part of the anode channel 22 which is situated between the output portion of the cell stack 12 and the mixing tank 28. An exhaust fluid that is discharged from the anode 67, that is, a gas-liquid two-phase flow containing an unreacted portion of the aqueous methanol solution that is not used for the chemical reaction and generated carbon dioxide ($CO_2$), is fed to the gas-liquid separator 32, in which the carbon dioxide is separated. The separated aqueous methanol solution is returned to the mixing tank 28 through the anode channel 22 and supplied again to the anode 67. The carbon dioxide separated by the gas-liquid separator 32 is discharged to the open air through a filter (not shown).

An intake port 24a and an exhaust port 24b of the cathode channel 24 individually open into the atmosphere. The ancillary components incorporated in the cathode channel 24 include an air filter 40, an air pump 42, and an exhaust filter 44. The air filter 40 is located near the intake port 24a of the cathode channel 24 on the upstream side of the cell stack 12. The air pump 42 is connected to that part of the cathode channel which is situated between the cell stack 12 and the air filter. The exhaust filter 44 is disposed between the cell stack 12 and the exhaust port 24b on the downstream side of the cell stack.

When the air pump 42 is actuated, air is fed to the cathode channel 24 through the intake port 24a. After the fed air passes through the air filter 40, it is fed from the air pump 42 to the cathode 66 of the cell stack 12, whereupon oxygen in the air is utilized for generation of electricity. The air discharged from the cathode 66 passes through the cathode channel 24 and the exhaust filter 44 and is discharged into the atmosphere through the exhaust port 24b.

The air filter 40 captures and removes dust in the air drawn into the cathode channel 24 and impurities and harmful substances, such as carbon dioxide, formic acid, fuel gas, methyl formate, formaldehyde, etc. The exhaust filter 44 purifies byproducts in the gas that is discharged to the outside through the cathode channel 24 and captures the fuel gas and the like in the exhaust.

In operating the fuel cell device 10 constructed in this manner as an energy source of the electronic device 17, the fuel pump 26, liquid pump 30, and air pump 42 are actuated under the control of the cell control section 16, and on-off valves are opened. Methanol is supplied from the fuel tank 14 to the mixing tank 28 by the fuel pump 26, whereupon it is mixed with water in the mixing tank to form an aqueous methanol solution with a desired concentration. Further, the aqueous methanol solution in the mixing tank 28 is supplied to the anode 67 of the cell stack 12 through the anode channel 22 by the liquid pump 30.

An air pump 42 draws the open air into the cathode channel 24 through its intake port 24a. As the air passes through the air filter 40, it is cleared of dust and impurities. After having passed through the filter 40, the air is supplied to the cathode 66 of the cell stack 12.

The methanol and air supplied to the cell stack 12 undergo an electrochemical reaction in the electrolyte membrane 144 that is located between the anode 67 and the cathode 66, whereupon electricity is generated between the anode and the cathode. The electricity generated in the cell stack 12 is supplied to the electronic device 17 through the cell control section 16.

With the progress of the electrochemical reaction, carbon dioxide and water are generated as reaction products on the sides of the anode 67 and the cathode 66, respectively, in the cell stack 12. The carbon dioxide generated on the anode side and the unreacted portion of the aqueous methanol solution that is not used for the chemical reaction are fed to the gas-liquid separator 32 through the anode channel 22, whereupon they are separated from each other. The separated aqueous methanol solution is recovered from the gas-liquid separator 32 into the mixing tank 28 through the anode channel 22 and reused for generation of electricity. The separated carbon dioxide is discharged from the separator 32 into the atmosphere.

Most of the water generated on the cathode 66 side of the cell stack 12 is reduced to steam, which is discharged together with air into the cathode channel 24. The gas that contains the discharged air and steam is fed to the exhaust filter 44, whereupon it is cleared of dust and impurities and then discharged to the outside through the exhaust port 24b of the cathode channel 24.

During the electricity generation operation described above, the cell control section 16 calculates the efficiency of electricity generation of the fuel cell device 10 based on the temperature of the cell stack 12 detected by the temperature sensor 18 and the load current of the electronic device 17. Based on this electricity generation efficiency, the cell control section 16 controls the methanol supply, thereby optimizing the concentration of the fuel supplied to the anode 67 and the electricity generation operation.

Figure 3:
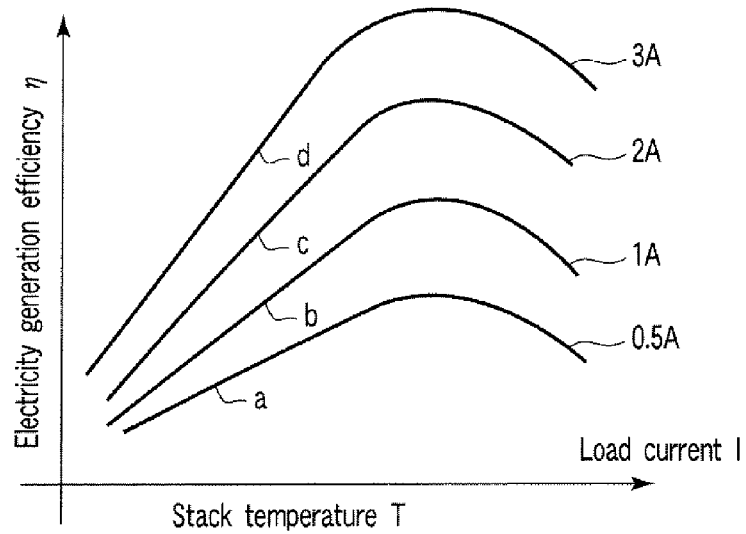
FIG. 3 is an exemplary diagram showing relationships between the cell stack temperature, load current for the cell stack, and electricity generation efficiency of the fuel cell device.

The cell control section 16 is previously loaded with data as a database indicative relationships between the temperature of the cell stack 12, load current, and electricity generation efficiency. FIG. 3 shows relationships between the stack temperature, load current, and electricity generation efficiency derived from the characteristics of the cell stack 12. A plurality of characteristic curves a, b, c and d represent relationships between the cell stack temperature and the electricity generation efficiency established with load currents of 0.5, 1, 2 and 3 A, respectively. The electricity generation efficiency of the fuel cell device has characteristics such that it is not fixed with respect to changes in the cell stack temperature and the load current, takes its maximum at a certain temperature or load current, and decreases with distance from the maximum. The cell control section 16 includes a memory (not shown), which is loaded with these characteristics as reference data. Further, the cell control section 16 is loaded with optimum fuel concentration values as reference values corresponding to the characteristics of the cell stack 12.

Figure 4:
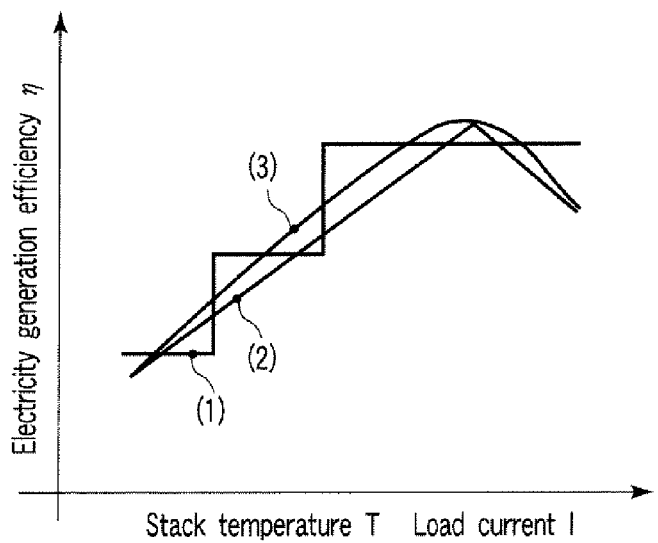
FIG. 4 is an exemplary diagram showing relationships between the cell stack temperature, load current for the cell stack, and electricity generation efficiency of the fuel cell device.

As shown in FIG. 4, the relationship between the cell stack temperature and the electricity generation efficiency may be approximated by a gradational change (1) or a linear change (2) as well as by a change (3) based on a certain function.

The following is a detailed description of an adjustment method for optimizing the concentration of the supplied fuel in the electricity generation operation of the fuel cell device. Specifically, the cell control section 16 obtains the electricity generation efficiency of the fuel cell device based on the cell stack temperature and the load current and calculates an estimated amount of methanol consumed by the generation of electricity based on the obtained electricity generation efficiency and a stack output.

Figure 5:
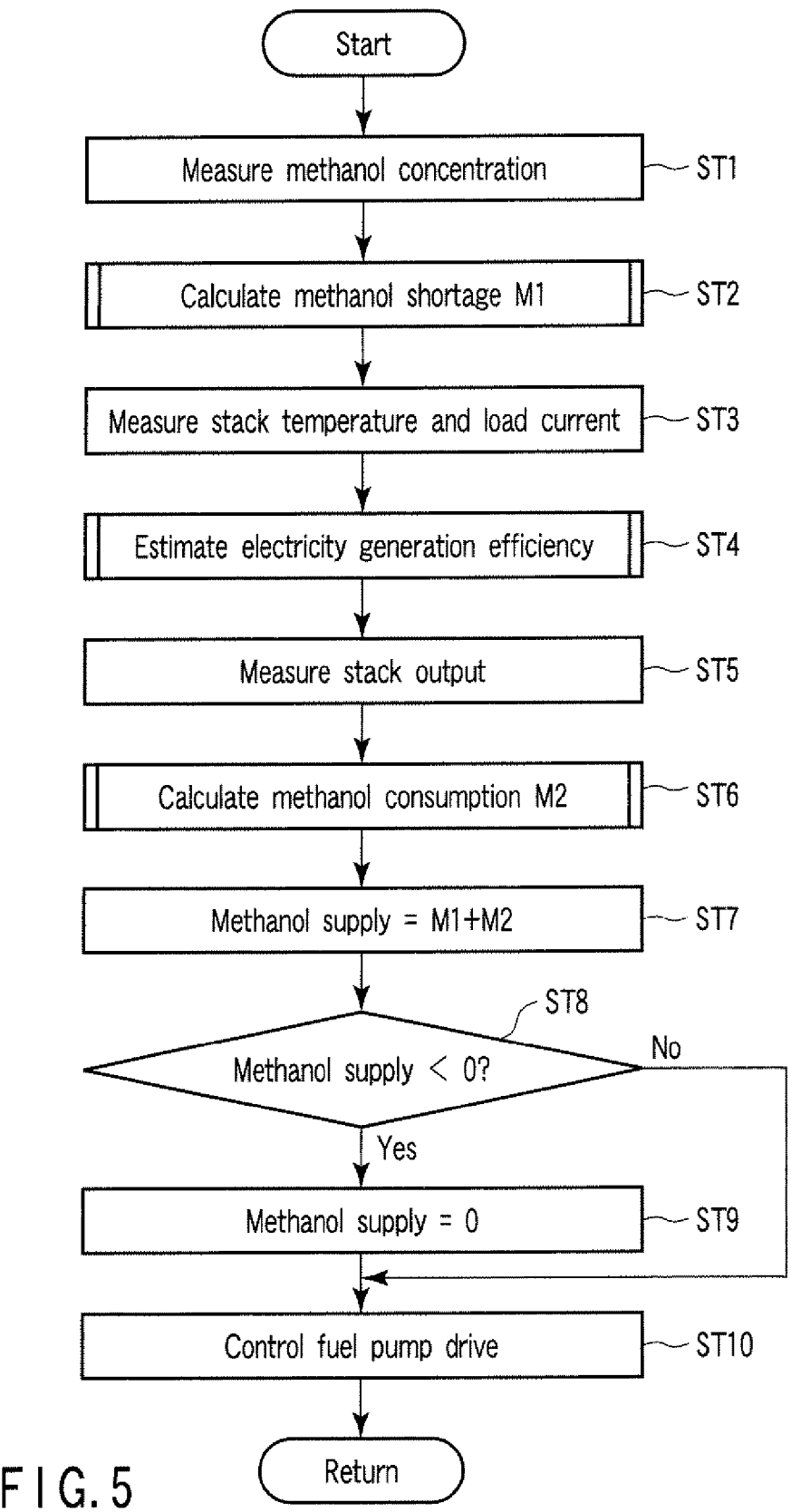
FIG. 5 is an exemplary flowchart showing an optimization operation for the fuel concentration of the fuel cell device.

The adjustment method will be described with reference to the flowchart of FIG. 5.

First, the cell control section 16 causes the concentration sensor 31 to detect the fuel concentration, that is, the methanol concentration of the aqueous methanol solution (ST1), and calculates a fuel shortage M1 based on the difference between the detected fuel concentration and a predetermined desired fuel concentration (ST2). Further, the cell control section 16 causes the temperature sensor 18 to detect the temperature of the cell stack 12 and measures the load current of the electronic device 17 to which energy is supplied from the fuel cell device 10 (ST3). The cell control section 16 obtains an electricity generation efficiency η(%) of the cell stack 12 based on the detected temperature of the cell stack 12, the measured load current, and the previously loaded reference data shown in FIG. 3 (ST4).

Subsequently, the cell control section 16 measures an output of the cell stack 12 and calculates a consumption M2 of the methanol by the cell stack 12 for electricity generation based on the measured output and the obtained electricity generation efficiency p (ST6). Further, the cell control section 16 calculates, as a methanol supply for replenishment, the amount of fuel (methanol) equivalent to the sum (M1+M2) of the calculated fuel shortage M1 and consumption M2 (ST7).

The cell control section 16 determines whether or not the calculated methanol supply for replenishment is less than zero (ST8). If the methanol supply is less than zero, the fuel pump 26 is controlled with the methanol supply regarded as zero, since a negative methanol supply is impossible (ST9). In other words, no methanol is supplied for replenishment. If it is concluded in ST8 that the calculated methanol supply for replenishment is greater than zero, the cell control section 16 controls the rotational frequency or drive voltage of the fuel pump 26, thereby supplying the methanol of an amount equivalent to the calculated methanol supply from the fuel tank 14 to the mixing tank 28. Thus, the concentration of the aqueous methanol solution supplied to the cell stack 12 can be kept at an optimum desired value for electricity generation.

In the fuel concentration control described above, mean values for a predetermined period are used for the load current for the cell stack 12 and the output value of the cell stack. This predetermined period is longer than the control period of the concentration control, e.g., one second, and shorter than a required time duration (e.g., quotient of the capacity (ml) of the anode channel 22 divided by the flow rate (ml/min) of the aqueous methanol solution) for the circulation of the aqueous methanol solution through the anode channel 22.

According to the fuel cell device constructed in this manner, the efficiency of electricity generation is obtained based on the cell stack temperature and the load current, the estimated amount of methanol consumed by the electricity generation is calculated based on the obtained electricity generation efficiency and the stack output, and the methanol supply is corrected. By doing this, an optimum amount of methanol can be supplied for replenishment. Thus, the fuel consumption can be accurately calculated based on the operating conditions of the fuel cell device, fluctuations in the ambient environment, variations in the energy consumption of the electronic device, etc. By supplying an amount of methanol equivalent to the consumption for replenishment, the concentration of the aqueous methanol solution can be stabilized at an optimum value such that the electricity generation operation of the fuel cell device is stable.

Thus, there can be obtained a method of driving a fuel cell device, in which an optimum amount of fuel is replenished to set an appropriate fuel concentration, whereby stable operations and enhanced output energy can be ensured.

While certain embodiments of the invention have been described, these embodiments have been presented by way of example only, and are not intended to limit the scope of the invention. Indeed, the novel methods and systems described herein may be embodied in a variety of forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The fuel cell device may also be built in the electronic device instead of being externally connected to the electronic device. The fuel used is not limited to methanol but may alternatively be alcohol or a hydrocarbon fuel. Further, the fuel supply section is not limited to the fuel pump but may be any other device such as an injection nozzle. If the injection nozzle is used, for example, a desired fuel concentration can be obtained by controlling the injection frequency based on a calculated fuel supply.

What is claimed is:

1. A method of driving a fuel cell device comprising an electromotive section, a tank configured to contain a fuel, a concentration sensor configured to detect a fuel concentration of a fuel supplied from the tank, and a temperature sensor configured to detect a temperature of the electromotive section, the method comprising:
    calculating a fuel shortage based on a difference between the fuel concentration detected by the concentration sensor and a desired fuel concentration;
    detecting the temperature of the electromotive section and a load current of an electronic device connected to the fuel cell device;
    calculating an efficiency of electricity generation of the electromotive section based on the detected temperature of the electromotive section, the load current measured by the control section, an efficiency characteristic of the electromotive section, stored in the control section,
    wherein the efficiency characteristic of the electromotive section is determined by taking the maximum at a certain temperature or load current, and decreasing with distance from the maximum and;
    calculating a fuel consumption by the electromotive section based on an output of the electromotive section and the calculated electricity generation efficiency; and
    replenishing the tank with an amount of fuel equivalent to the sum of the calculated fuel shortage and the calculated fuel consumption.

2. The method of driving a fuel cell device according to claim 1, wherein the electricity generation efficiency is calculated based on the characteristic indicative of relationships between a temperature of the electromotive section, the load current, and the electricity generation efficiency.

3. The method of driving a fuel cell device according to claim 1, wherein mean values for a predetermined period are used for the load current for the electronic device and the output of the electromotive section, the predetermined period being longer than a control period of a fuel concentration control and shorter than a required time duration for circulation of the fuel from the tank to the electromotive section.

4. The method of driving a fuel cell device according to claim 1, which further comprises driving a fuel pump in accordance with the sum of the calculated fuel shortage and the calculated fuel consumption to supply a fuel to the tank.

5. The method of driving a fuel cell device according to claim 4, the driving comprises controlling the fuel pump with the sum of the calculated fuel shortage and the calculated fuel consumption regarded as zero when the sum is less than zero.

6. The method of driving a fuel cell device according to claim 1, wherein methanol, alcohol, or a hydrocarbon fuel is used as the fuel.

* * * * *